Nov. 13, 1956    W. D. HOCKENSMITH, JR    2,770,490
MULTIPLE BODY DUMPING TRUCK TRAILER
Filed Aug. 3, 1954                                          2 Sheets-Sheet 2
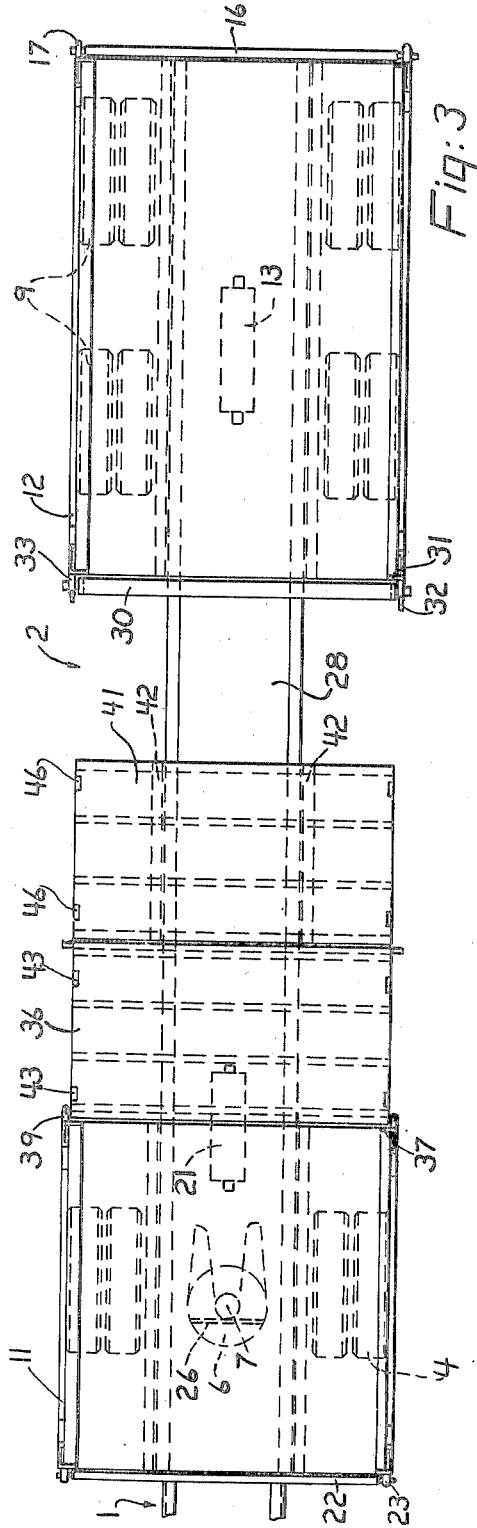
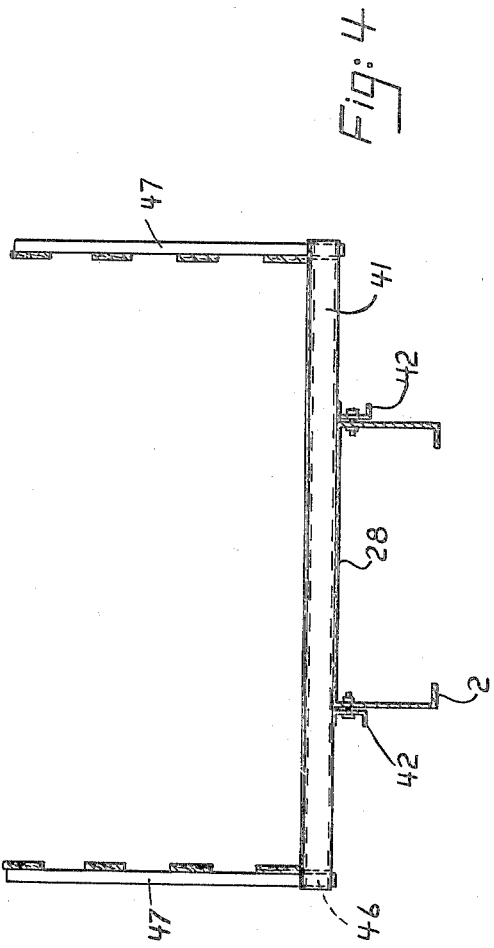
INVENTOR.
WILBUR D. HOCKENSMITH, Jr.
BY
Brown, Critchlow, Flick & Peckham
His ATTORNEYS United States Patent Office 2,770,490
Patented Nov. 13, 1956

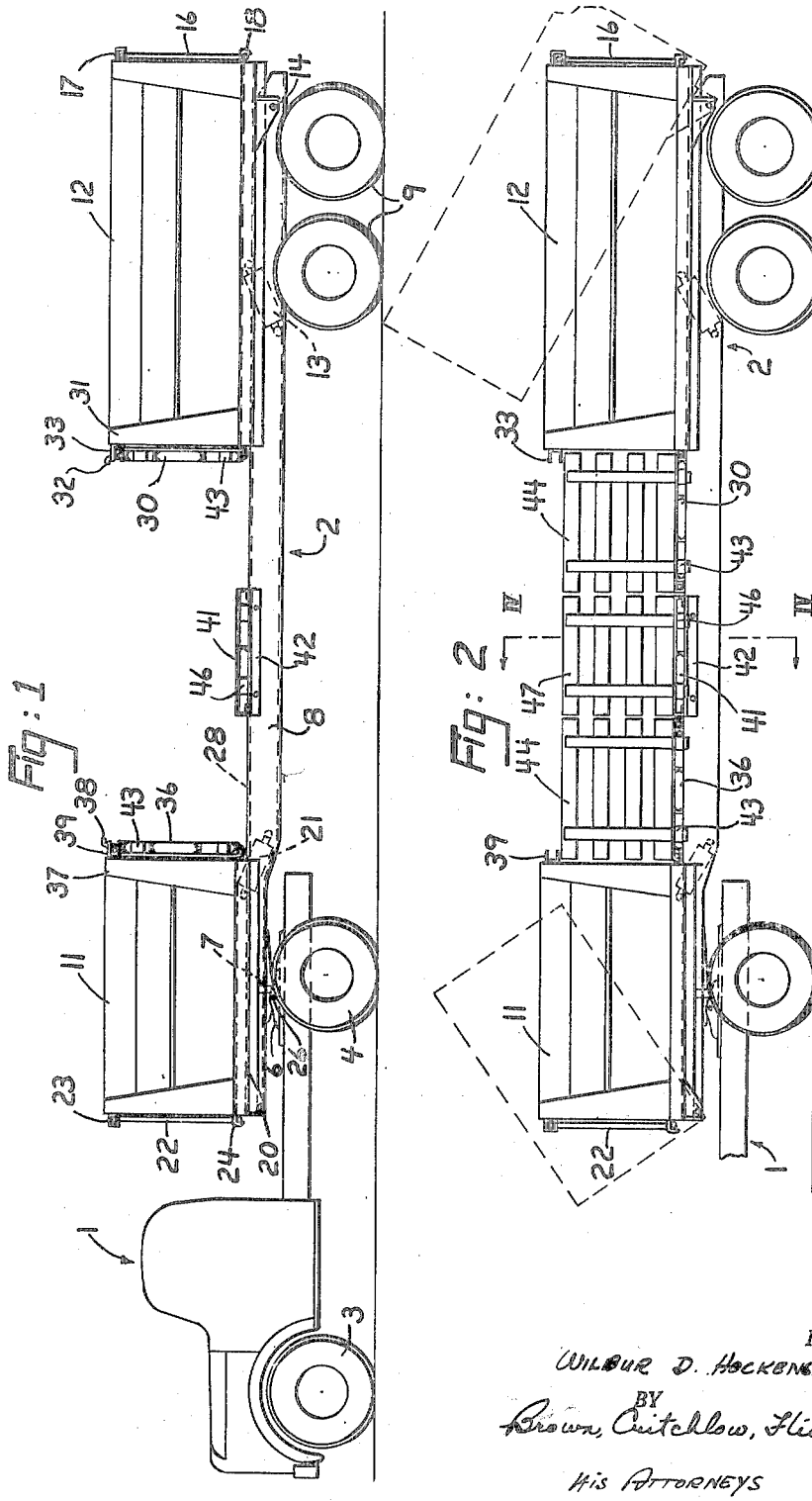

2,770,490

MULTIPLE BODY DUMPING TRUCK TRAILER

Wilbur D. Hockensmith, Jr., Irwin, Pa.

Application August 3, 1954, Serial No. 447,615

11 Claims. (Cl. 298—8)

This invention relates to truck trailers, and more particularly to those provided with dumping bodies.

In all States there are laws that control the maximum load that can be carried by a truck or trailer, as well as the load that can be placed on each axle. Most States determine the maximum load by the length of the vehicle. Thus, the distance from the center line of the front axle of an automotive tractor to the rear axle of the trailer it is hauling determines the legal load that can be carried. This is called a bridge formula and it varies somewhat in the different States. It keeps the axle loads far enough apart to protect the highways from heavy, concentrated loads. Single dump bodies long enough to carry the maximum permissible load in bridge formula States would need to be over thirty feet long in many cases. Bodies of such lengths are very dangerous to dump, because when they are raised they make the trailers so top-heavy that they can be upset fairly easily. Furthermore, in such cases both the bodies and the trailers must be heavily built to withstand the great lifting loads that are imposed when the bodies are dumped. The required heavy construction increases the tare weight and thereby reduces the pay load that can be hauled, because the gross weight at the tires is limited.

It is among the objects of this invention to provide a dumping truck trailer which can carry the maximum legal load in bridge formula States, which does not require a dangerously long body, which can be relatively light in weight, which properly distributes the load over the trailer, which is readily convertible from a double body dump trailer into a conventional single body trailer of full trailer length, and which can be loaded from the center.

The preferred embodiment of the invention is illustrated in the accompanying drawings, in which Fig. 1 is a side view of the trailer as used as a dump truck;

Fig. 2 is a side view showing the trailer converted into a long body trailer;

Fig. 3 is an enlarged plan view of the trailer with the inner end of the front body open; and Fig. 4 is an enlarged cross section taken on the line IV—IV of Fig. 2.

Referring to Fig. 1 of the drawings, a truck is formed from a tractor 1 and a semi-trailer 2. The tractor has front wheels 3 and a pair of back wheels 4, although for greater capacity it could be provided with tandem rear wheels in a well-known manner. On the back part of the tractor there is a fifth wheel 6 to which the king pin 7 of the trailer is connected in the usual way. The trailer has a long frame formed from parallel beams 8, the rear ends of which are supported by two pairs of wheels 9 mounted in tandem. It is a feature of this invention that two dumping bodies are mounted on the trailer frame, one body 11 over the front end portion of the frame and the other body 12 over the rear end portion of the frame. The front end of the rear body can be raised when desired in the usual way by means of a fluid pressure cylinder 13 operated in any suitable manner so that the body will pivot at 14 and dump its load over the back end of the frame. The back or outer end of the rear body is provided with the usual tail gate 16 hinged at its top in body brackets 17 and normally held closed by pivoted latches 18 at the bottom.

Another feature of this invention is that the front body is mounted for dumping over the front end of the trailer frame. For this purpose the front or outer end of the body is pivotally connected to the front end of the frame at 20, and the rear or inner end of the body can be raised by a fluid pressure cylinder 21 to tilt the body forward. The front end of the body is provided with a dump gate 22 hinged at the top in body brackets 23 and normally held closed by a pivoted latch 24 at the bottom.

The great advantage of the trailer described thus far is that the load is carried in two different relatively short bodies instead of in one long body which would be dangerous to dump and which would require a much heavier construction with a resulting loss or pay load. In order to dump the front body it is necessary to turn the tractor at an angle to the trailer, preferably a 90° angle, so that dumping will be over the side of the tractor frame. Dumping of the load on the underlying tractor back wheel is avoided by having the front of the body project ahead of the king pin 7, far enough to cause the bottom of the dump gate 22 to be located at the outside of the underlying tractor wheel when the tractor is turned at right angles and the body is tilted. Where the width of the tractor at the wheels is the maximum allowed, which in most States is eight feet, king pin 7 should not be less than approximately four feet from the front of the front body unless other provision is made to have the load clear the tractor wheels during dumping. Any tendency of the trailer to tilt sideways when the tractor is at right angles to it can be avoided by using the fifth wheel known at the Holland-Apgar safety fifth wheel, in which the rocking shaft 26 always remains parallel to the rear axle of the trailer.

The longer the distance from the front axle of the tractor to the rear axle of the trailer, within maximum limits, the greater the load that can be carried in bridge formula States. The two bodies make it possible to haul a full load on a truck of maximum length, without either body being dangerously or undesirably long, because the front and rear bodies can be spaced apart a considerable distance by a long length of the frame between them. The length of the bodies, which generally will not need to exceed eleven feet, and their position on the trailer frame is such that substantially all of the weight of the front body is supported by the rear tractor wheels 4, while substantially all the weight of the rear body is supported by the trailer wheels. When the tractor has only a single rear axle as shown in the drawings, the front body necessarily is shorter than the rear body which is supported by two axles. The capacities of the two bodies should be such as to load the underlying axles to approximately their legal limits. Another way of expressing it is that the ratio of the volume of the front body to the volume of the rear body should be substantially the same as the ratio of the legal carrying capacity of the tractor's rear wheels, minus tare weight, to the legal carrying capacity of the trailer wheels, minus tare weight.

An important feature of this invention is that the spacing of the dumping bodies permits the trailer to be converted quickly from a dumper to a conventional trailer with a long body. Even without the conversion, a load of different material can be carried in the open area between the bodies, provided the gross weight for the truck is not exceeded. For example, sand and gravel could be carried in the dumping bodies while concrete blocks and sacks of cement are tied down onto a deck 28 located between the frame beams extending between the adjacent inner ends of the bodies, as shown in Figs. 3 and 4.

There are times, especially while returning from a trip after the bodies have been dumped, when it is desirable to carry a return load of a different character, such as lumber, poles or steel beams, that may not fit in the bodies. This invention makes the carrying of such a load possible, because the inner ends of the dumping bodies can be opened by swinging them vertically or horizontally. Preferably, the front end of the rear body is formed by a gate 30 that is hinged to the bottom of that body. The gate normally is held up against the front corner posts 31 of the body by removable pins 32 extending down through U-shape brackets 33 fastened to the posts. Likewise, the inner end of the front body normally is closed by a gate 36 hinged at the bottom and held up against corner posts 37 by pins 38 removably mounted in brackets 39 projecting from the posts.

When it is desired to open the inner ends of the two bodies, either to permit loading from the center of the trailer or to allow long objects to extend out of the bodies, the upper ends of the inner gates 30 and 36 are released and swung down onto the frame between the bodies, forming a platform in the open area. The gates are thick enough so that when they are in horizontal position their upper surfaces will be on the same level as the floors of the bodies. If the space between the bodies is longer than can be filled by the horizontal gates, the space between the lower gates can be filled with a platform section 41 provided with parallel channels 42 on its bottom which can be temporarily or permanently bolted to the side beams of the frame. With this arrangement, the trailer has a continuous platform or floor extending from front to back, as shown in Fig. 2.

Long objects that extend into both bodies will be held in place by the sides of the bodies. To hold shorter articles on the platform between the bodies, the ends of the inner gates may be provided with transverse openings in which sleeves 43 are mounted. When these gates are lowered onto the frame the sleeves are vertical and ready to receive the lower ends of the stake side panels 44. The opposite sides of platform section 41 likewise can be provided with vertical sleeves 46, in which stake side panels 47 can be removably mounted. With all of the panels in place, the trailer has side walls extending its full length and carry anything that an ordinary stake truck can carry. When the trailer is being used as a dump truck, the side panels can be lashed down to the central platform section 41 or to the deck 23 between the bodies. While the inner gates are up, the ends of sleeves 43 fit against the adjacent corner posts of the bodies to keep the loads from sifting out through the sleeves.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A trailer adapted to be pulled by an automotive tractor, comprising a frame, separate dumping bodies mounted on the front and rear end portions of the frame, dump gates normally closing the outer ends of the bodies, the front body being pivotally mounted near its front end on the frame for dumping its load forward over the front end of the frame and the rear body being pivotally mounted near its rear end on the frame for dumping its load backward over the rear end of the frame.

2. A trailer as defined in claim 1, in which the front portion of the frame is provided with a fifth wheel king pin spaced behind the dump gate of the front body a distance approximately one-half of the width of the tractor, whereby the front body can dump over the wheels of the tractor when the latter is turned 90° to the trailer.

3. A trailer as defined in claim 1, in which said frame is longer than the total length of the dumping bodies and is below the bodies and provides an open area between them, whereby the load can be distributed over a considerable length of the road without using a long dumping body, and a deck supported by the frame between the bodies.

4. The combination with an automotive tractor having front and rear wheels, of a semi-trailer comprising a long frame supported at its front end by the tractor and at its rear end by trailer wheels, separate dumping bodies mounted on the front and rear end portions of the frame with an open area between them, and dump gates normally closing the outer ends of the bodies, the front body being pivotally mounted for dumping its load forward over the front end of the frame when the tractor is turned at an angle thereto, the rear body being pivotally mounted for dumping its load backward over the rear end of the frame, and the length and position of the bodies relative to the frame being such that substantially all of the weight of the front body is supported by the rear tractor wheels and substantially all of the weight of the rear body is supported by the trailer wheels.

5. The combination with an automotive tractor having front and rear wheels, of a semi-trailer comprising a long frame supported at its front end by the tractor and at its rear end by trailer wheels, separate dumping bodies mounted on the front and rear end portions of the frame with an open area between them, and dump gates normally closing the outer ends of the bodies, the front body being pivotally mounted for dumping its load forward over the front end of the frame when the tractor is turned at an angle thereto, the rear body being pivotally mounted for dumping its load backward over the rear end of the frame, and the ratio of the volume of the front body to the volume of the rear body being substantially the same as the ratio of the legal carrying capacity of the tractor rear wheels minus tare weight to the legal carrying capacity of the trailer wheels minus tare weight.

6. A trailer adapted to be pulled by an automotive tractor, comprising a long frame, separate dumping bodies mounted on the front and rear end portions of the frame with an open area between them, dump gates normally closing the outer ends of the bodies, the front body being mounted for dumping its load over the front end of the frame and the rear body being mounted for dumping its load over the rear end of the frame, and gates normally closing the inner ends of said bodies but hinged thereto to allow the gates to be swung out into said open area to provide the bodies with open inner ends.

7. A trailer adapted to be pulled by an automotive tractor, comprising a long frame, separate dumping bodies mounted on the front and rear end portions of the frame with an open area between them, dump gates normally closing the outer ends of the bodies, the front body being mounted for dumping its load over the front end of the frame and the rear body being mounted for dumping its load over the rear end of the frame, and gates normally closing the inner ends of said bodies but hinged at their bottoms to allow the gates to be swung toward each other and down onto the frame in said open area, whereby to provide the bodies with open inner ends having a platform between them.

8. A trailer as defined in claim 7, in which said bodies have floors on substantially the same level as said platform.

9. A trailer as defined in claim 7, in which the opposite ends of the raised inner gates are provided with horizontal openings that form vertical recesses in the opposite edges of said platform for receiving stake side panels.

10. A trailer adapted to be pulled by an automotive tractor, comprising a long frame, separate dumping bodies mounted on the front and rear end portions of the frame with an open area between them, dump gates normally closing the outer ends of the bodies, the front body being mounted for dumping its load over the front end of the frame and the rear body being mounted for dumping its load over the rear end of the frame, a platform section mounted on the frame midway between said bodies and spaced therefrom, and gates normally closing the inner ends of said bodies but hinged at their bottoms to allow them to be swung toward each other and downward, the height of the gates being substantially equal to the distance between the bodies and said platform section, whereby when the gates are swung down they will be supported by the frame between said platform section and the bodies to form a continuous platform between the open inner ends of the bodies.

11. A trailer as defined in claim 10, in which said platform section is removably mounted on said frame.

References Cited in the file of this patent

UNITED STATES PATENTS

| 273,202 | Wallace | Feb. 27, 1883 |
| 1,237,796 | McClellan | Aug. 21, 1917 |
| 2,465,244 | Lutz | Mar. 22, 1949 |

FOREIGN PATENTS

| 151,027 | Germany | May 9, 1904 |